US009727711B2

United States Patent
Xu et al.

(10) Patent No.: US 9,727,711 B2
(45) Date of Patent: Aug. 8, 2017

(54) METHOD AND APPARATUS FOR ACCOUNT INTERCOMMUNICATION AMONG APPS

(71) Applicant: Baidu Online Network Technology (Beijing) Co., Ltd, Beijing (CN)

(72) Inventors: Lingzhi Xu, Beijing (CN); Keke Zhou, Beijing (CN); Weifeng Huang, Beijing (CN); Huiping Wang, Beijing (CN); Guofeng Han, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 133 days.

(21) Appl. No.: 14/586,796

(22) Filed: Dec. 30, 2014

(65) Prior Publication Data

US 2015/0302185 A1 Oct. 22, 2015

(30) Foreign Application Priority Data

Apr. 16, 2014 (CN) .......................... 2014 1 0153657

(51) Int. Cl.
*G06F 21/30* (2013.01)
*G06F 9/46* (2006.01)
(Continued)

(52) U.S. Cl.
CPC .............. *G06F 21/30* (2013.01); *G06F 9/468* (2013.01); *G06F 9/54* (2013.01); *G06F 21/126* (2013.01); *G06F 21/41* (2013.01)

(58) Field of Classification Search
None
See application file for complete search history.

(56) References Cited

U.S. PATENT DOCUMENTS 8,887,152 B1 * 11/2014 Chen ................... G06F 9/45504
717/174
9,009,806 B2 * 4/2015 Hyland ............... H04L 63/0861
726/8

(Continued)

FOREIGN PATENT DOCUMENTS

WO   WO 2011/028139 A1   3/2011

OTHER PUBLICATIONS

EP, Extended European Search Report, EP Application No. 14200738.4, Apr. 11, 2016.

*Primary Examiner* — Michael R Vaughan
(74) *Attorney, Agent, or Firm* — Orrick, Herrington & Sutcliffe, LLP

(57) ABSTRACT

A method and apparatus for account intercommunication among APPs. The method comprises: acquiring account information entered by a user in a current APP; and, after using the account information to log in successfully, providing the account information to other APPs having intercommunication permissions with the current APP for the other APPs to log in. Via the disclosed method, account information entered in any APP may be shared among APPs having intercommunication permissions with the APP, so that other APPs may be logged into using an intercommunicated account after they are opened, without the need to manage account information about various APPs through a unified entrance, and thus the APP need not access the entrance in advance, and login can be realized without the need to exit the APP to open the entrance; obviously, the flexibility and independence of APP login are improved, and the complexity of operation is reduced.

10 Claims, 9 Drawing Sheets

(51) Int. Cl.
*G06F 9/54* (2006.01)
*G06F 21/12* (2013.01)
*G06F 21/41* (2013.01)

(56) References Cited

U.S. PATENT DOCUMENTS

| | | | |
|---|---|---|---|
| 9,065,819 B1* | 6/2015 | Shanmugam | H04L 63/0815 |
| 9,111,083 B2* | 8/2015 | Taveau | G06F 21/30 |
| 9,123,063 B2* | 9/2015 | Setton | G06Q 30/0277 |
| 9,124,575 B2* | 9/2015 | Friedmann | H04L 63/0815 |
| 9,237,145 B2* | 1/2016 | Sondhi | H04L 63/08 |
| 2012/0291114 A1 | 11/2012 | Poliashenko et al. | |
| 2013/0081126 A1* | 3/2013 | Soukup | H04L 63/0815 |
| | | | 726/8 |
| 2013/0332723 A1* | 12/2013 | Tan | G06F 21/606 |
| | | | 713/150 |
| 2014/0068779 A1* | 3/2014 | Tan | G06F 21/606 |
| | | | 726/26 |
| 2015/0348015 A1* | 12/2015 | Ren | G06Q 20/3226 |
| | | | 705/41 |

* cited by examiner

METHOD AND APPARATUS FOR ACCOUNT INTERCOMMUNICATION AMONG APPS

CROSS-REFERENCE TO RELATED APPLICATIONS

The present application claims priority to Chinese Patent Application No. CN201410153657.1, filed on Apr. 16, 2014, the entire disclosure of which is incorporated herein by reference in its entirety and for all purposes.

TECHNICAL FIELD

The present invention relates to the technical field of computer applications, and in particular to a method and apparatus for account intercommunication among APPs.

BACKGROUND

With the rapid development of today's science and technology, intelligent terminals such as smartphones and tablet computers are more and more widely used, and are gradually becoming important tools for people in communication, entertainment, learning and even office working. Generally, the existing intelligent terminals may load various APPs (Applications) to realize corresponding functions, and most APPs require a user to register an account to log in, such as the QQ (an APP in the instant communication tool class) login interface shown in FIG. 1; when opening the APP of QQ, the user needs to enter account information such as an account and a password in the QQ login interface first.

However, due to the limitations of the screen size of an intelligent terminal, input methods, etc., it is inconvenient to enter the account information through an intelligent terminal. In addition, in many cases, the same service provider will provide multiple APPs, for example, Baidu provides APPs such as Baidu Map, Baidu Assistant, Baidu Music and Baidu Library, and various APPs of the same service provider generally use the same account system. Therefore, the question of how to perform account intercommunication among APPs so as to simplify the operation of a user entering account information has become a new research target.

At present, the existing method in the Android system is to realize the account management of various APPs through an Account Manager coming with the android system. Specifically, APPs with the same account information access the Account Manager in advance; when needing to log into these APPs, a user opens the Account Manager, enters account information about an APP that he/she wants to log into in the Account Manager interface, and then simultaneous login of various APPs with the same account information may be realized. However, this method has the following defects: the implementation thereof is rigid and complicated; APPs with the same account information need to access the Account Manager in advance; and a user has to jump out of the APP and then open the Account Manager interface to enter the account information so as to log into the APP.

SUMMARY

In view of this, provided in the present invention are a method and apparatus for account intercommunication among APPs, so as to improve the flexibility of APPs when logging in and reduce the complexity of operation.

The specific technical solutions are as follows:

provided in the present invention is a method for account intercommunication among applications (APPs), and the method comprises:

acquiring account information entered by a user in a current APP; and after using the account information to log in successfully, providing the account information to other APPs having intercommunication permissions with the current APP for the other APPs to log in.

According to a preferred embodiment of the present invention, the step of providing the account information to other APPs having intercommunication permissions with the current APP comprises:

the current APP providing, by means of system broadcast, the account information to other APPs having intercommunication permissions with the current APP; or the current APP storing the account information in a public account pool for other APPs having intercommunication permissions with the current APP to acquire.

According to a preferred embodiment of the present invention, after using the account information to log in successfully, the method further comprises:

storing the account information or the account information after encryption in a private storage space of the current APP.

According to a preferred embodiment of the present invention, the step of the current APP providing, by means of system broadcast, the account information to other APPs having intercommunication permissions with the current APP comprises:

the current APP making the account information or the account information after encryption included in a system broadcast; and according to permissions information carried in the system broadcast, if it is determined that an APP receiving the system broadcast has intercommunication permissions with an APP sending the system broadcast, acquiring the account information or the account information after encryption from the system broadcast and storing same in the private storage space for login.

According to a preferred embodiment of the present invention, the method further comprises:

if the current APP runs for the first time, the current APP querying, by sending a system broadcast, account information about other APPs having intercommunication permissions with the current APP; and storing the account information obtained through query or the account information obtained through query after encryption in the private storage space of the current APP.

According to a preferred embodiment of the present invention, the public account pool is a Keychain.

According to a preferred embodiment of the present invention, the step of the current APP storing the account information in a public account pool for other APPs having intercommunication permissions with the current APP to acquire comprises:

the current APP storing the account information or the account information after encryption in a Keychain corresponding to the intercommunication permissions of the current APP; and when other APPs having intercommunication permissions with the current APP are opened, acquiring the account information from the Keychain and storing same in the private storage space thereof.

According to a preferred embodiment of the present invention, the method further comprises:

if the current APP runs for the first time, acquiring the account information from the Keychain corresponding to the intercommunication permissions of the current APP and storing same in the private storage space thereof.

According to a preferred embodiment of the present invention, the method further comprises:

if the private storage space of the current APP stores the account information, then according to a configured login policy of the current APP, using one of the following methods to log in:

when the login policy is silent intercommunication login, using the account information stored in the private storage space directly to log in; and when the login policy is selective intercommunication login, displaying pieces of account information stored in the private storage space to a user for the user to select one of them to log in.

According to a preferred embodiment of the present invention, when the login policy is silent intercommunication login, the account information is an account and a password; and when the login policy is selective intercommunication login, the account information is an account, and login is realized by acquiring a password entered by the user.

Further provided in the present invention is an apparatus for account intercommunication among APPs; the apparatus comprises:

an active acquisition unit for acquiring account information entered by a user in an APP where the apparatus is located; and an account intercommunication unit for providing, after the APP where the apparatus is located uses the account information to log in successfully, the account information to other APPs having intercommunication permissions with the APP where the apparatus is located for the other APPs to log in.

According to a preferred embodiment of the present invention, the account intercommunication unit comprises: a broadcast processing subunit or an account pool processing subunit;

wherein the broadcast processing subunit is used for providing, by means of system broadcast, the account information to other APPs having intercommunication permissions with the APP where the apparatus is located; and the account pool processing subunit is used for storing the account information in a public account pool for other APPs having intercommunication permissions with the APP where the apparatus is located to acquire.

According to a preferred embodiment of the present invention, the apparatus further comprises:

an account storage unit for storing, after the APP where the apparatus is located uses the account information to log in successfully, the account information or the account information after encryption in a private storage space of the APP where the apparatus is located.

According to a preferred embodiment of the present invention, the apparatus further comprises: the account storage unit;

wherein the broadcast processing subunit is specifically used for sending the system broadcast containing the account information or the account information after encryption; after the system broadcast is received, if it is determined, according to permissions information carried in the system broadcast, that the APP where the apparatus is located has the same intercommunication permissions as an APP that sent the system broadcast, acquiring the account information or the account information after encryption from the received system broadcast and providing same to the account storage unit; and the account storage unit is used for storing the account information or the account information after encryption which is provided by the broadcast processing subunit in the private storage space of the APP where the apparatus is located for login.

According to a preferred embodiment of the present invention, the broadcast processing subunit is also used for querying, by sending a system broadcast, account information about other APPs having intercommunication permissions with the APP where the apparatus is located if the APP where the apparatus is located runs for the first time, and providing the account information obtained through query or the account information obtained through query after encryption to the account storage unit.

According to a preferred embodiment of the present invention, the public account pool is a Keychain.

According to a preferred embodiment of the present invention, the apparatus further comprises: the account storage unit;

wherein the account pool processing subunit is specifically used for storing the account information or the account information after encryption in a Keychain corresponding to the intercommunication permissions of the APP where the apparatus is located; and when the APP where the apparatus is located is opened, acquiring the account information from the Keychain corresponding to the intercommunication permissions of the APP where the apparatus is located and providing same to the account storage unit; and the account storage unit is used for storing the account information provided by the account pool processing subunit in the private storage space of the APP where the apparatus is located.

According to a preferred embodiment of the present invention, the account pool processing subunit is also used for acquiring, if the APP where the apparatus is located runs for the first time, the account information from the Keychain corresponding to the intercommunication permissions of the APP where the apparatus is located and storing same in the private storage space of the APP where the apparatus is located.

According to a preferred embodiment of the present invention, the apparatus further comprises:

a login processing unit for using, if the private storage space of the current APP stores the account information, one of the following methods to log in according to a configured login policy of the current APP:

when the login policy is silent intercommunication login, using the account information stored in the private storage space directly to log in; and when the login policy is selective intercommunication login, displaying pieces of account information stored in the private storage space to a user for the user to select one of them to log in.

According to a preferred embodiment of the present invention, when the login policy is silent intercommunication login, the account information is an account and a password; and when the login policy is selective intercommunication login, the account information is an account, and the login processing unit needs to acquire a password entered by the user to log in.

It can be seen from the above technical solution that, by means of the method of the present invention, account information entered in any APP may be shared among APPs having intercommunication permissions with the APP, so that other APPs may be logged into using the intercommunicated account after being opened, without managing the account information about various APPs through a unified entrance; the APP need not access the entrance in advance, and it is not required that the login may be realized only when the entrance is opened after exiting the APP; obviously, the flexibility and independence of APP login is improved, and the complexity of operation is reduced.

BRIEF DESCRIPTION OF THE ACCOMPANYING DRAWINGS

DETAILED DESCRIPTION OF THE PREFERRED EMBODIMENTS

In order to make the objectives, technical solutions and advantages of the present invention more apparent, the present invention is described in detail hereinbelow in conjunction with the accompanying drawings and specific embodiments.

The core idea of the present invention is: if account information entered by a user in a currently running APP is acquired, then after using the account information to log in successfully, providing the account information to other APPs having intercommunication permissions with the APP for the other APPs to log in.

The methods for providing account information among APPs may be, but are not limited to, the following two: one is the method of system broadcast; and the other one is the method of storing the account information in a public account pool for other APPs to acquire. The methods for account intercommunication using these two methods are respectively described further below by means of different embodiments.

Embodiment I

In this embodiment, taking the Android system for example, account intercommunication among various APPs having intercommunication permissions is realized through a system broadcast function coming with the Android system. With regard to the broadcast method, the various APPs are equal and may all initiate broadcast and receive broadcast.

Figure 1:
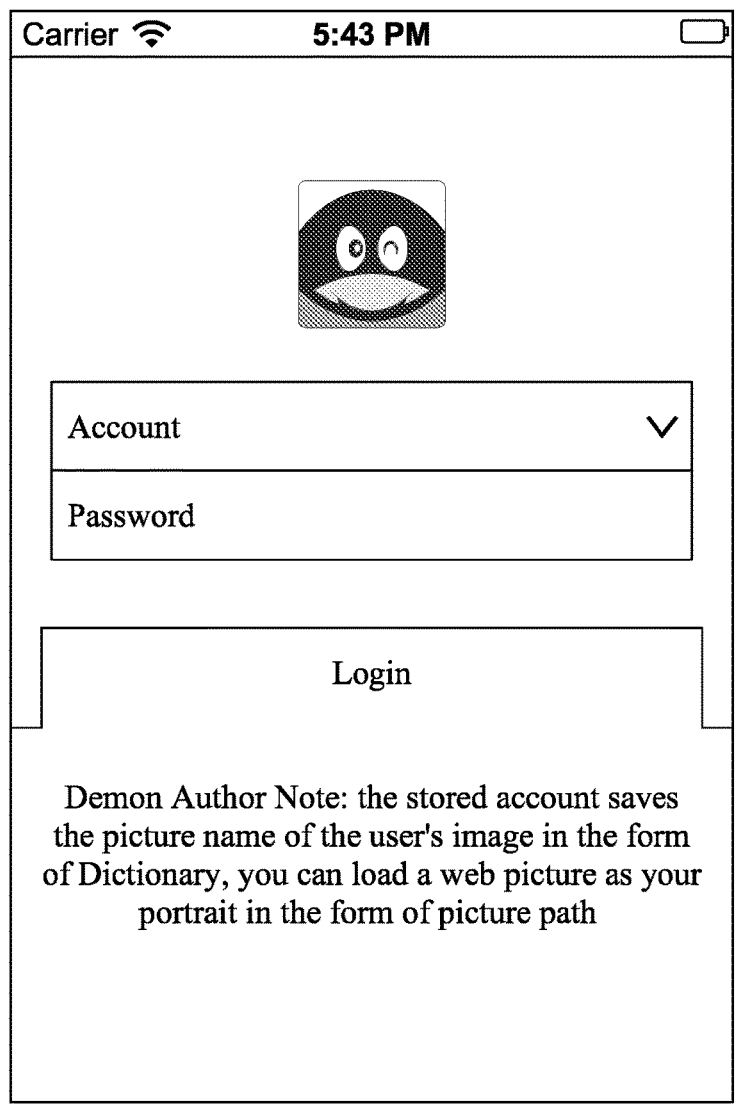
FIG. 1 is an instance diagram of an APP login interface in an intelligent terminal.
Figure 2:
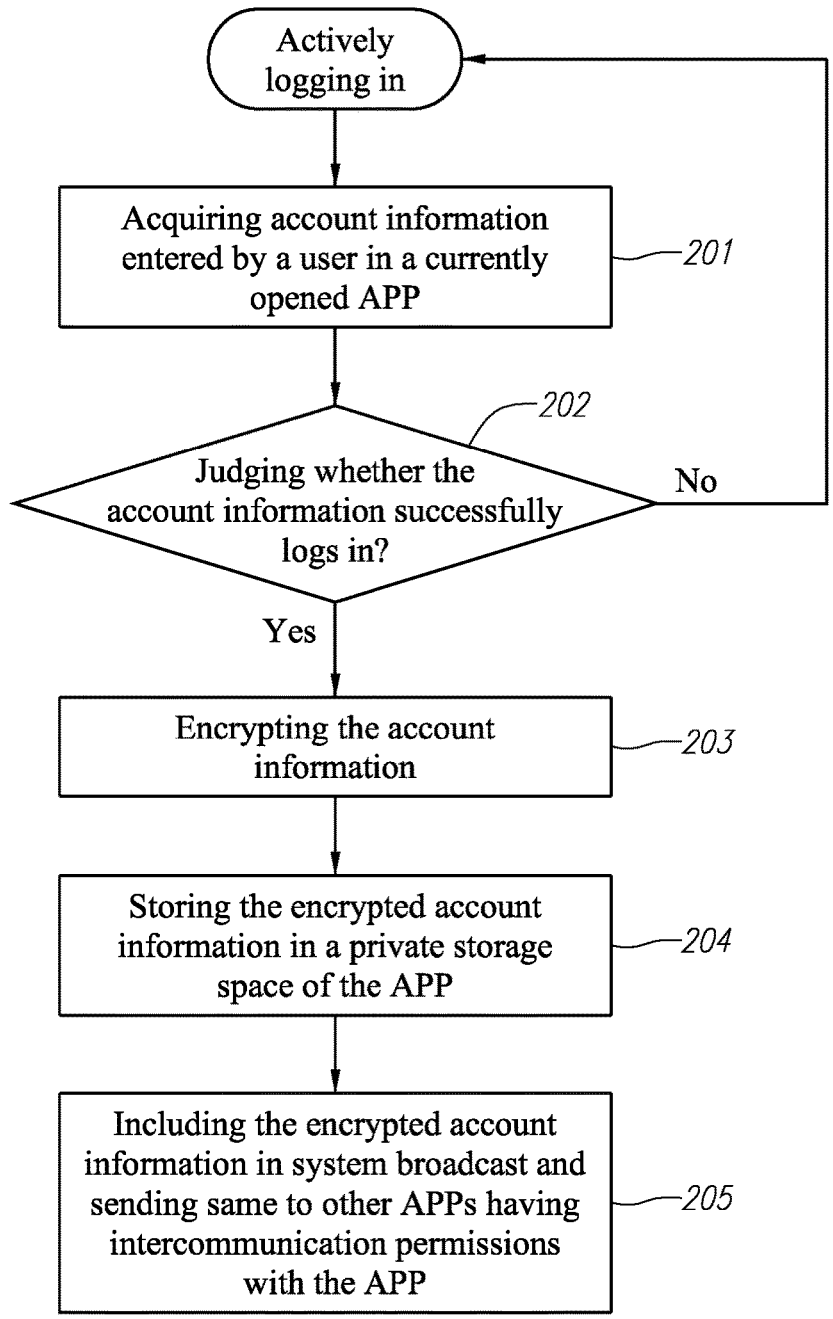
FIG. 2 is a flowchart of a method for account intercommunication in an active login mode provided in embodiment I of the present invention.

This embodiment is applied to the following usage scenario: a user logs into an APP in an active manner, that is, when a login interface of a certain running APP is opened, the user logs in by manually entering the account information. This active login method may be adopted when an APP runs for the first time and may also be adopted when the APP is not running for the first time; it may be adopted when the APP does not store any account information locally and may also be adopted when the APP stores available account information locally. This active login method is actively initiated by a user, and as long as the user actively initiates active login for a certain APP, the APP merely passively acquires the account information entered by the user in the login interface, and executes the procedure in this embodiment. As shown in FIG. 2, the method mainly comprises the following procedure:

201: account information entered by a user in a currently opened APP is acquired.

202: It is judged whether the account information logs in successfully, and if not, login failure is prompted to the user, and the user may re-enter the account information; and if yes, 203 is executed.

203: The account information is encrypted.

This step is a preferred step executed in order to improve the security of the account information, and APPs having intercommunication permissions may share one encryption mechanism, so as to ensure that only APPs having intercommunication permissions may acquire the account information. Certainly, the absence of encryption does not affect the implementation of the objective of the present invention.

The intercommunication permissions of various APPs are introduced simply herein; generally, the APPs have certain permissions, for example, in various APPs of the Android system, permissions information about the APPs is provided in a manifest file, and for example, a Baidu service provider may declare the intercommunication permissions of the APPs provided thereby through a BaiduSharePermission parameter.

204: The encrypted account information is stored in a private storage space of the APP.

There are private storage spaces in various APPs for storing available account information about the APPs, and when the login is successful in an active login mode, the account information for the active login mode may be stored in the private storage space. The private storage space may also store account information acquired in other manners, which will be dealt with in subsequent embodiments.

205: The encrypted account information is included in the system broadcast and sent to other APPs having intercommunication permissions with the APP.

In the system broadcast, in order to be able to help other APPs to recognize whether they have intercommunication permissions with an APP sending the broadcast, the permissions information about the APP sending the broadcast may be contained in the system broadcast. In addition, in order to further improve the security of the account information, the encrypted account information may be encrypted again and then sent through system broadcast.

It needs to be noted that the above-mentioned 204 and 205 are not executed in a fixed order, may be executed in any order, and may also be executed simultaneously.

Figure 3:
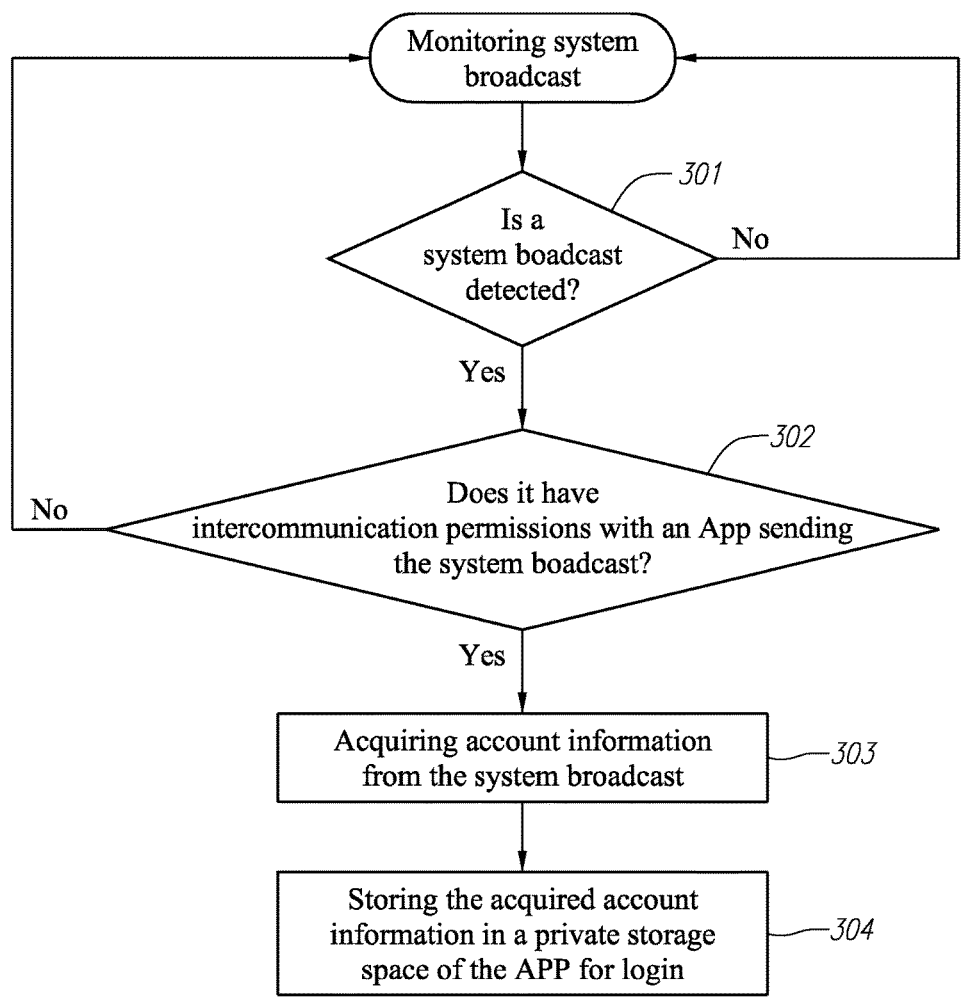
FIG. 3 is a flowchart executed by an APP receiving a system broadcast provided in embodiment I of the present invention.

For an APP receiving the system broadcast, the procedure executed thereby may be as shown in FIG. 3, and mainly comprises the steps as follows:

301: whether the APP detects a system broadcast, and if yes, 302 is executed; otherwise, continue to monitor system broadcast.

302: The APP judges whether it has intercommunication permissions with an APP sending the system broadcast, and if yes, 303 is executed; otherwise, it discards the system broadcast, and continues to monitor system broadcast.

The APP receiving the system broadcast compares the permissions information thereof with the permissions information contained in the system broadcast, so as to determine whether it has intercommunication permissions with the APP.

303: Account information is acquired from the system broadcast.

If the account information is further encrypted when the system broadcast is sent, then in this step, the account information is acquired from the system broadcast by decryption, and the acquired account information is actually the encrypted account information.

304: The acquired account information is stored in a private storage space of the APP for login.

After the APP acquires the account information, when the APP is opened subsequently, different login modes may be selected according to login policies herein. The login policies here may comprise but are not limited to: silent intercommunication login and selective intercommunication login.

Silent intercommunication login refers to a "logging into one, logging into all" login mode, which means that as long as one of the APPs having intercommunication permissions logs in successfully, other APPs also use the account information acquired through system broadcast to log in. With this login policy, in 304 above, the APP receiving the system broadcast may be directly logged into using the acquired account information (that is the account information in the private storage space thereof) when being opened.

Selective intercommunication login means that the successful login of one of the APPs having intercommunication permissions does not affect the login of other APPs, and the account information thereof will be provided to other APPs to store; and when the user opens other APPs to log in, the stored account information will be provided to the user for the user to perform selective login. With this login policy, in 304 above, after the APP receiving the system broadcast stores the acquired account information in the private storage space of the APP, if the APP is opened by the user, the account information in the private storage space of the APP may be displayed to the user in the login interface, and the user may select one piece of account information therefrom to log in.

It needs to be noted that the account information involved in the embodiments of the present invention at least comprises an account, and may further comprise a password. With the silent intercommunication login policy, the account information generally comprises an account and a password. With the selective intercommunication login policy, the account information may only comprise an account, and when selecting one account in the account information displayed in the APP to log in, the user needs to enter a correct password manually to log in successfully. This content will also be dealt with in detail later.

Embodiment II

Figure 4:
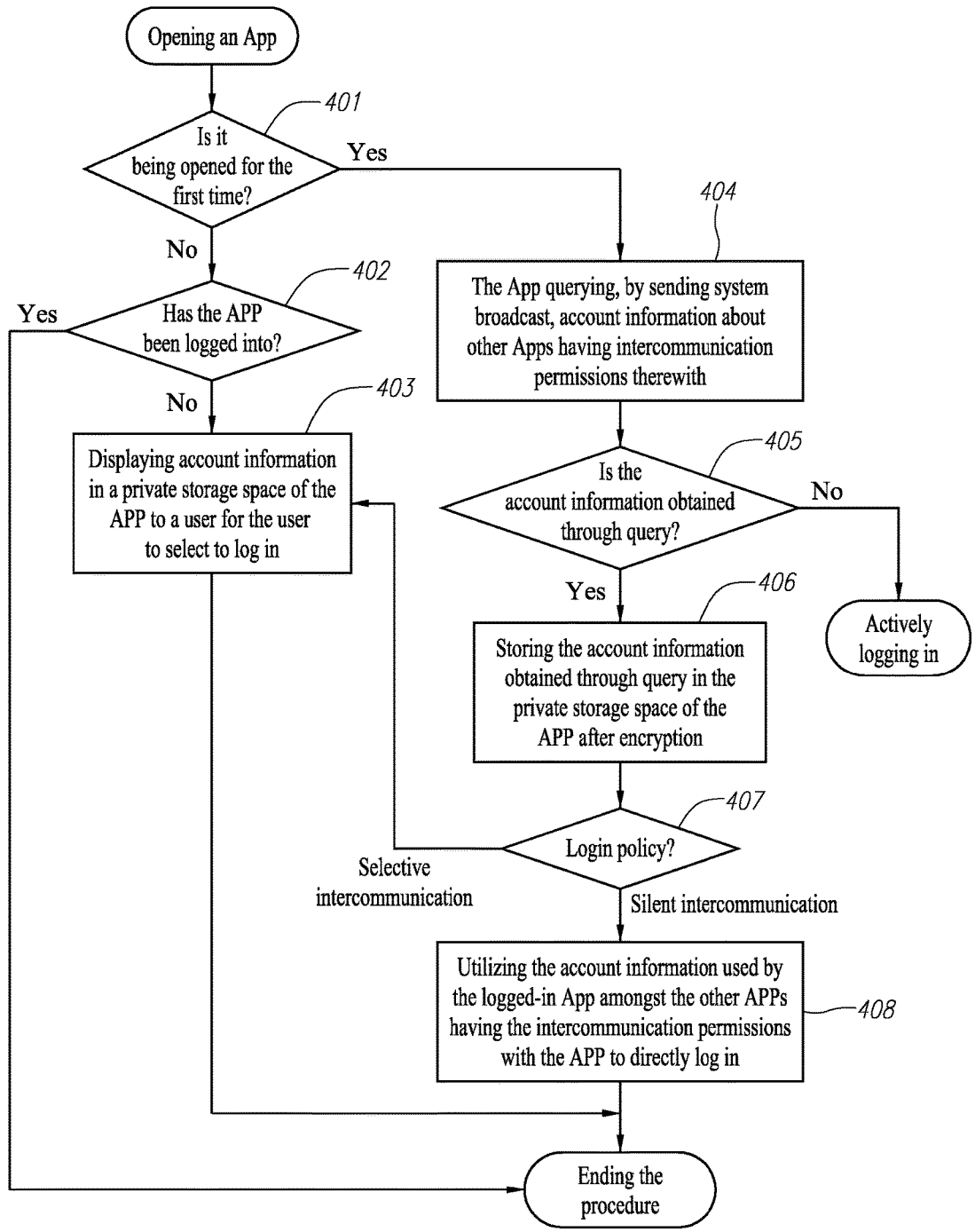
FIG. 4 is a flowchart executed after an APP is opened, provided in embodiment II of the present invention.

In this embodiment, taking the android system for example, the procedure executed is completely described from the time when a user opens a certain APP; as shown in FIG. 4, the procedure comprises the steps as follows:

401: it is judged whether the APP is opened for the first time, and if not, 402 is executed; and if yes, 404 is executed.

That is, it is judged whether the APP runs for the first time after being installed, and if yes, then it is considered as being opened for the first time.

402: It is judged whether the APP has been logged into, and if yes, the current procedure is ended; otherwise, step 403 is executed.

403: Account information in a private storage space of the APP is displayed to the user for the user to select to log in, and if the login is successful, the current procedure is ended.

Figure 5:
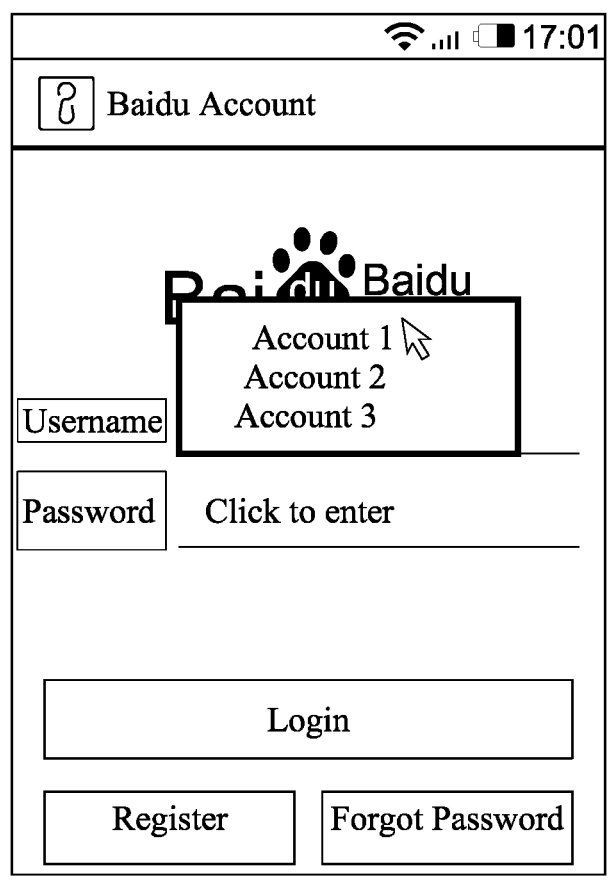
FIG. 5 is an instance diagram of a login interface in a selective intercommunication login category provided in embodiment II of the present invention.

Actually, the kind of operation specifically executed in 403 is related to a configured login policy of the APP, and in this flow, the login policy is configured as selective intercommunication login; if it is assumed that the private storage space of the APP has stored pieces of account information, these pieces of account information are all pieces of account information that may be used by the APP, and may be displayed to the user; and if the user selects one of these pieces of account information, the account information is utilized to log into the APP. Generally, the account information in this case only contains accounts, that is, more than one account is provided to the user in the form of a list, and after selecting one account therefrom, the user manually enters a password to log in. Taking Baidu Library for example, as shown in FIG. 5, assuming that the user has opened the APP of Baidu Library in a smartphone, when this step is to be executed, the account information in the private storage space of the APP will be displayed in a login interface of the APP, and is assumed to be account 1, account 2 and account 3 and may be displayed to the user in the form of a text box; assuming that the user selects account 1 and manually enters a password, then Baidu Library may be logged into.

If the APP is configured with the silent intercommunication login policy, then 403 is replaced with using the account information in the private storage space to directly log in.

404: The APP queries the account information about other APPs having intercommunication permissions therewith by sending a system broadcast.

If the APP runs for the first time, then the APP may query available account information from other APPs having intercommunication permissions therewith by sending a system broadcast. If having intercommunication permissions with the APP sending the system broadcast, the APP receiving the system broadcast replies with the account information in the private storage space thereof to the APP by means of system broadcast, and the system broadcast of the reply may also contain login state information. In this way, if the APP containing the account information is received, and if the login policy is configured to be silent intercommunication login, account information used by a logged-in APP in the received system broadcast may be directly used to log in.

405: Is the account information obtained through query, and if so, 406 is executed; otherwise, the procedure of active login is executed.

406: The account information obtained through query is stored in the private storage space of the APP after encryption.

407: According to the login policy configured by the APP, corresponding login processing is executed, and if it is selective intercommunication login, 403 is executed; and if it is silent intercommunication login, 408 is executed.

408: The account information used by the logged-in APP amongst other APPs having intercommunication permissions with the APP is used to directly log in, and if the login is successful, the current procedure is ended.

If the APP which runs for the first time does not obtain the account information through query by means of system broadcast, the user may use the active login mode to log into the APP, and in this case, the execution procedure is as shown in FIG. 2.

Embodiment III

In this embodiment, taking an IOS system for example, a Keychain of the IOS system is used for account intercommunication; herein, the Keychain is equivalent to a public account pool, and the Keychain may differentiate APPs with different permissions through domains, that is, the APPs having intercommunication permissions may correspond to the same Keychain, and may all perform "read-write" operations on the Keychain; in this embodiment, that is to store account information in the Keychain and acquire the account information from the Keychain.

Figure 6:
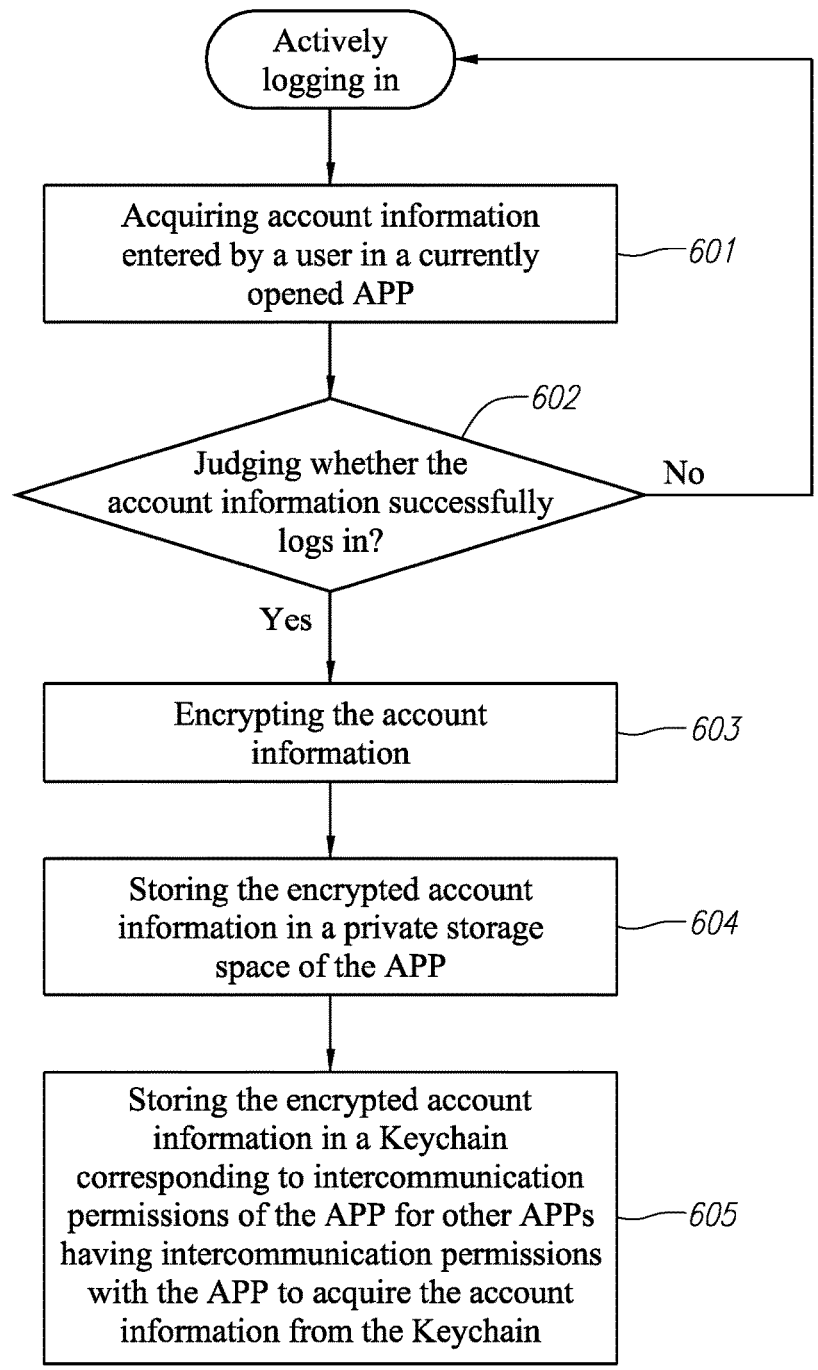
FIG. 6 is a flowchart of a method for account intercommunication in an active login mode provided in embodiment III of the present invention.

Similarly to embodiment I, this embodiment is applied to the following usage scenario: a user logs into an APP in an active manner, that is, when a login interface of a certain running APP is opened, the user logs in by manually entering the account information. This active login mode may be adopted when an APP runs for the first time and may also be adopted when the APP is not running for the first time; it may be adopted when the APP does not store any account information locally and may also be adopted when the APP stores available account information locally. This active login mode is actively initiated by a user, and as long as the user actively initiates active login to a certain APP, the APP merely passively acquires the account information entered by the user in the login interface, and executes the procedures in this embodiment. As shown in FIG. 6, the method mainly comprises the following procedure:

601-604 are the same as 201-204 in FIG. 2 and will not be described again in detail.

605: The encrypted account information is stored a Keychain corresponding to the intercommunication permissions of the APP, for other APPs having intercommunication permissions with the APP to acquire account information from the Keychain.

For example, in the IOS system, the intercommunication permissions of the APP may be declared through a KeychainSharing parameter in a capabilities file of the APP, and if the intercommunication permissions are consistent with the intercommunication permissions declared in the domains of the Keychain, the APP may access the Keychain.

Similarly, the above-mentioned 604 and 605, are not executed in a fixed order, may be executed in any order, and may also be executed simultaneously.

For an APP, there are mainly two cases regarding when to acquire the account information from the Keychain in this embodiment:

one case is that when an APP is opened, if the APP is configured with the silent intercommunication login policy, then an interface of silent intercommunication login needs to be invoked; at this moment, the APP acquires the account information from the Keychain corresponding thereto and stores same in the private storage space of the APP; actually, information synchronization is performed on the Keychain and the private storage space once. Then, the account information in the private storage space is utilized to directly log in, and in this case, the account information contains not only the account but also the password.

The other case is that when an APP is opened, if the APP is configured with the selective intercommunication login policy, then an interface of selective intercommunication login needs to be invoked; at this moment, the APP acquires the account information from the Keychain corresponding thereto and stores same in the private storage space of the APP, that is, information synchronization is performed on the Keychain and the private storage space once. Then, pieces of account information in the private storage space are displayed to the user for the user to select one of them for login. In this case, the account information may only contain an account, and the user needs to manually enter a password to login successfully.

Embodiment IV

Figure 7:
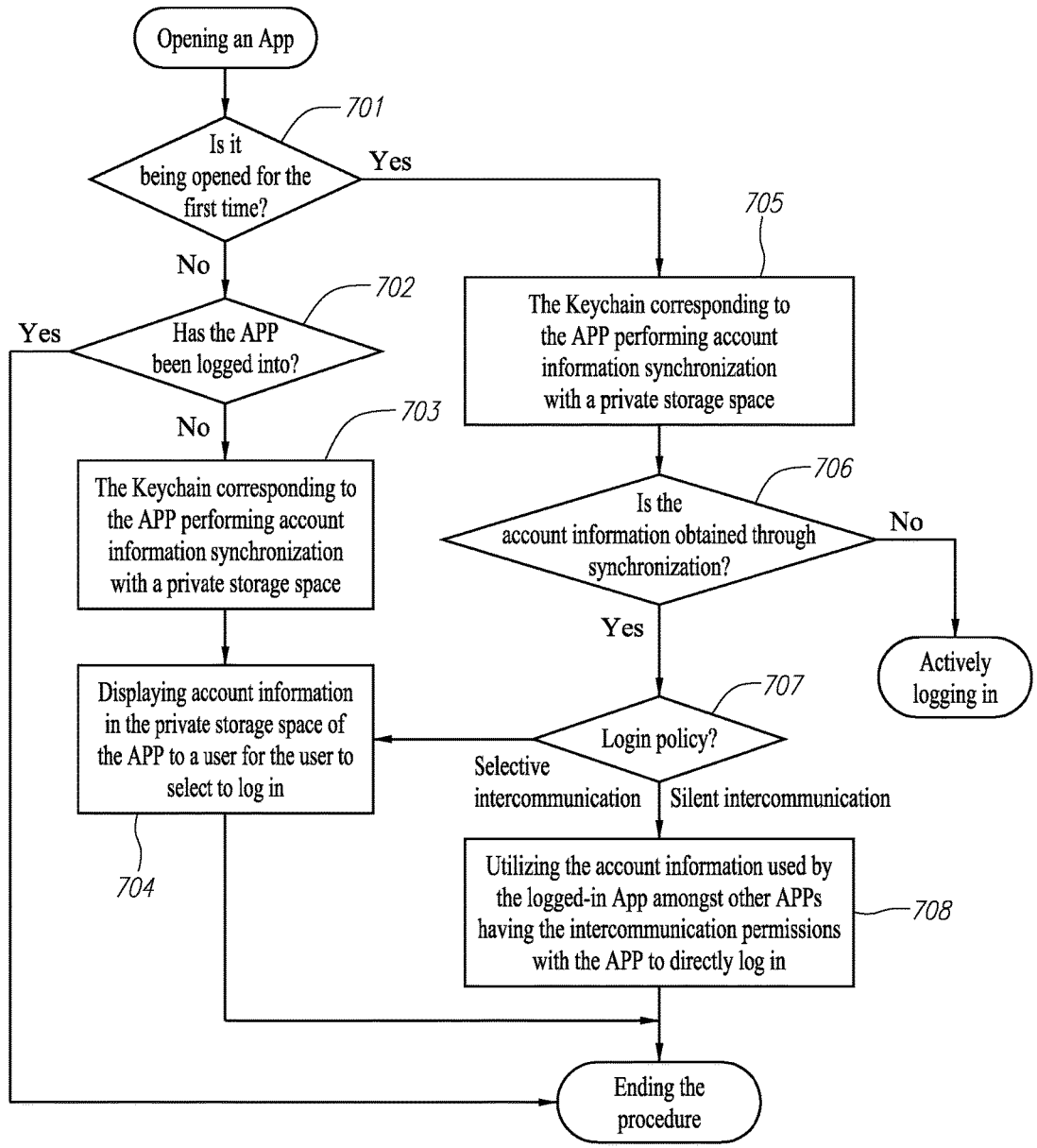
FIG. 7 is a flowchart executed after an APP is opened, provided in embodiment IV of the present invention.

In this embodiment, taking the android system for example, the executed procedure is completely described from the time when a user opens a certain app; as shown in FIG. 7, the procedure comprises the steps as follows:

701: it is judged whether an APP runs for the first time, and if not, 702 is executed; and if yes, 705 is executed.

702 is the same as 402 in FIG. 4.

703: The Keychain corresponding to the APP performs account information synchronization with the private storage space.

In this step, no matter whether the login policy of the APP is configured to be silent intercommunication login or selective intercommunication login, the APP will be triggered to perform account information synchronization, that is, account information synchronization between the Keychain and the private storage space of the APP, and in this step, the specific representation may be to store the account information that is in a Keychain corresponding to the APP in the private storage space of the APP.

704 is the same as 403 in FIG. 4.

705: The Keychain corresponding to the APP performs account information synchronization with the private storage space.

In this step, the specific representation may also be to store the account information that is in a Keychain corresponding to the APP in the private storage space of the APP.

706: Is the account information obtained synchronously, and if so, 707 is executed; otherwise, the procedure of active login is executed.

If the APP which runs for the first time does not obtain the account information from the corresponding Keychain by synchronization, the user may use the active login mode to log into the APP, and in this case, the execution procedure is as shown in FIG. 6.

707: According to the login policy configured by the APP, corresponding login processing is executed, and if it is selective intercommunication login, 704 is executed; and if it is silent intercommunication login, 708 is executed.

708 is the same as 408 in FIG. 4.

The above is a detailed description of the method provided in the present invention, and the apparatus provided in the present invention is described in detail below through embodiment V.

Embodiment V

Figure 8:
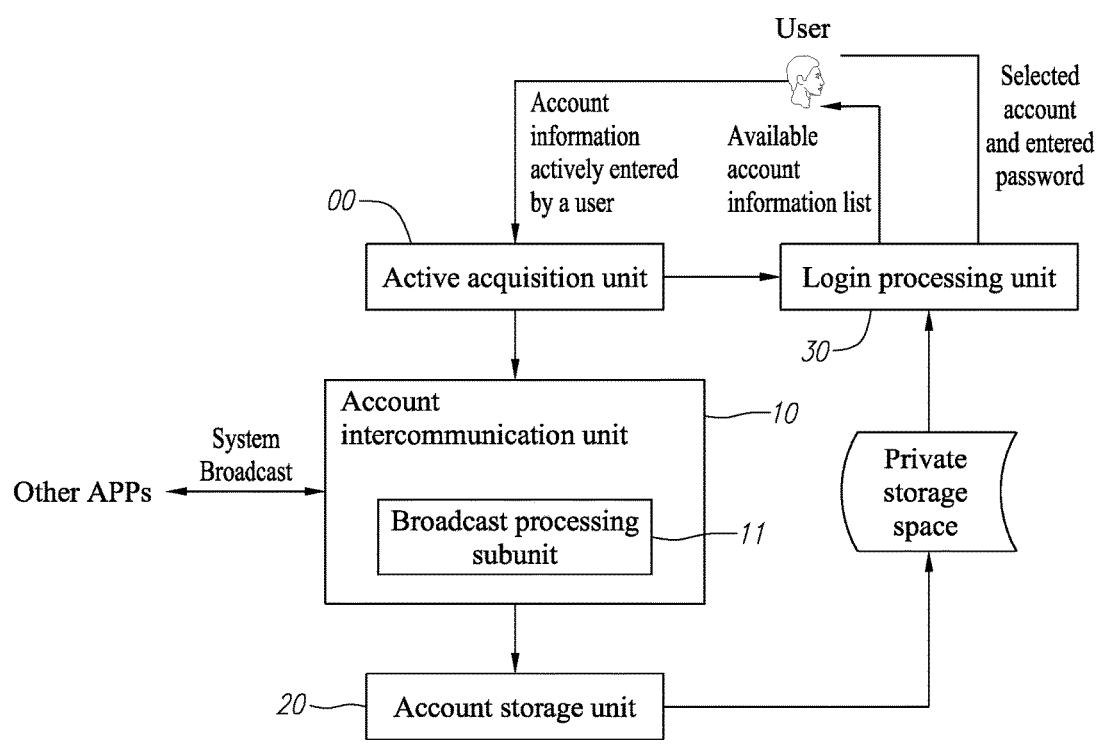
FIG. 8 is a structural diagram of an apparatus provided in embodiment V of the present invention.

FIG. 8 is a structural diagram of an apparatus provided in embodiment V of the present invention, and the apparatus provided in the embodiment of the present invention is generally arranged in an APP; as shown in FIG. 8, the apparatus comprises: an active acquisition unit 00 and an account intercommunication unit 10, and may further comprise an account storage unit 20.

The active acquisition unit 00 is responsible for acquiring account information entered by a user at the APP where the apparatus is located, that is, acquiring the account information entered in the currently opened APP by the user when in an active login mode.

The account intercommunication unit 10 is responsible for providing, after the APP where the apparatus is located uses the account information to log in successfully, the account information to other APPs having intercommunication permissions with the APP where the apparatus is located for the other APPs to log in.

The account storage unit 20 stores, after the APP where the apparatus is located uses the account information to log in successfully, the account information or the account information after encryption in a private storage space of the APP where the apparatus is located.

When providing the account information to the other APPs, the account intercommunication unit 10 may use the following two methods but is not limited thereto: one is the method of system broadcast; and the other one is the method of storing the account information in a public account pool for other APPs to acquire. The apparatus structures corresponding to these two methods are respectively described in detail below.

As shown in FIG. 8, when the system broadcast method is adopted, the account intercommunication unit 10 may comprise: a broadcast processing subunit 11, which provides the account information to other APPs having intercommunication permissions with the APP where the apparatus is located through system broadcast. This method may be applied to the Android system and uses the system broadcast coming with the Android system. For a broadcast method, the various APPs are equal and may all initiate broadcast and receive broadcast.

Specifically, on one hand, the APP where the apparatus is located may serve as a sender of the system broadcast, that is, the broadcast processing subunit 11 sends the system broadcast containing the account information or the account information after encryption. On the other hand, it may also serve as a receiver of the system broadcast, that is, after the broadcast processing subunit 11 receives the system broadcast, if it is determined, according to permissions information carried in the system broadcast, that the APP where the apparatus is located has the same intercommunication permissions as the APP sending the system broadcast, the account information or the account information after encryption is acquired from the received system broadcast and is provided to the account storage unit 20. The account storage unit 20 stores the account information or the account information after encryption which is provided by the broadcast processing subunit 11 in the private storage space of the APP where the apparatus is located for login.

If it is determined, according to the permissions information carried in the system broadcast, that the APP where the apparatus is located does not have the same intercommunication permissions as the APP sending the system broadcast, the broadcast processing subunit 11 discards the system broadcast and continues to monitor system broadcast.

Making the account information after encryption included in the system broadcast is a method which is adopted in order to improve the security of the account information, and APPs having intercommunication permissions may share one encryption mechanism, so as to ensure that only the APPs having intercommunication permissions may acquire the account information.

In addition, if the APP where the apparatus is located runs for the first time, then after the APP is opened, the broadcast processing subunit 11 may first query account information about other APPs having intercommunication permissions with the APP where the apparatus is located by sending system broadcast, and provide the account information obtained through query or the account information obtained through query after encryption to the account storage unit 20.

In addition to containing the account information, the above-mentioned system broadcast may further contain login state information, so that the APPs acquiring these pieces of information, if the login policy is configured to be silent intercommunication login, can directly use the account information used by the logged-in APP to log in.

Figure 9:
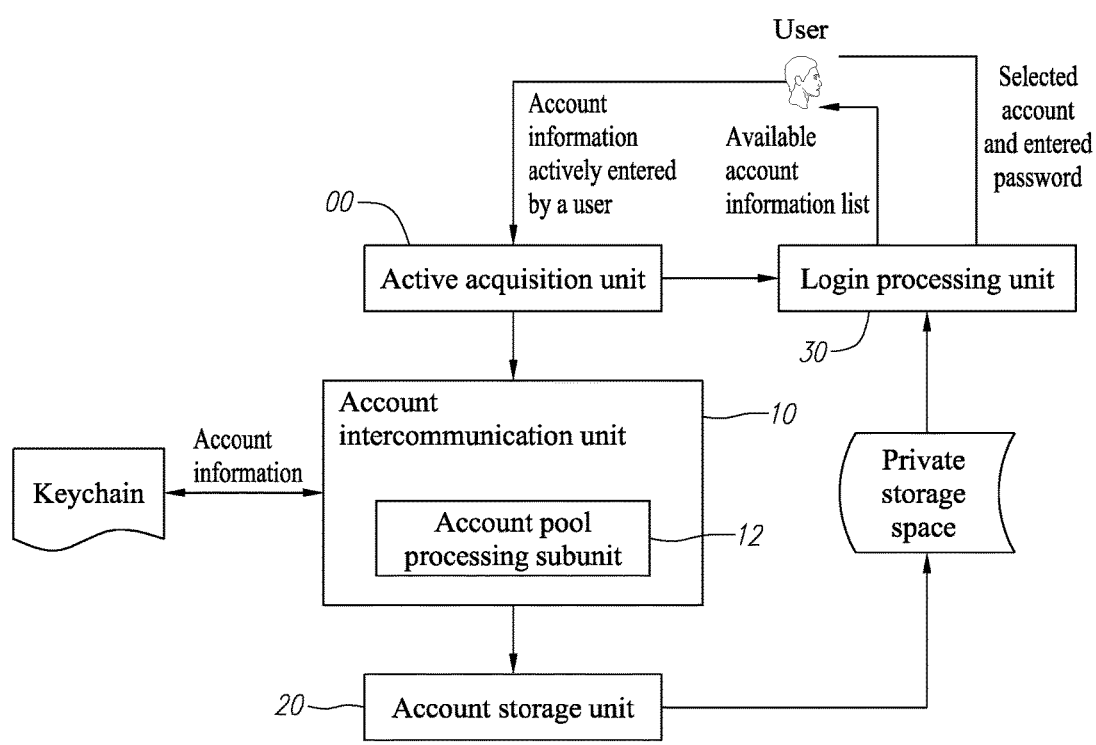
FIG. 9 is another structural diagram of an apparatus provided in embodiment V of the present invention.

As shown in FIG. 9, if the method of storing the account information in a public account pool for other APPs to acquire is adopted, the account intercommunication unit 10 may comprise: an account pool processing subunit 12 for storing the account information in the public account pool for other APPs having intercommunication permissions with the APP where the apparatus is located to acquire. This method may be applied to the IOS system, and the corresponding public account pool is a Keychain. The Keychain may differentiate APPs with different permissions through domains, that is, the APPs having intercommunication permissions may correspond to the same Keychain, and may all perform "read-write" operations on the Keychain; in this embodiment, that is to store account information in the Keychain and acquire the account information from the Keychain.

Specifically, on one hand, the APP where the apparatus is located may be taken as a "writer" of the Keychain, that is, the account pool processing subunit 12 stores the account information or the account information after encryption in a Keychain corresponding to the intercommunication permissions of the APP where the apparatus is located. On the other hand, it may also be taken as a "reader" of the Keychain, that is, when the APP where the apparatus is located is opened, the account pool processing subunit 12 acquires the account information from the Keychain corresponding to the intercommunication permissions of the APP where the apparatus is located and provides same to the account storage unit 20. The account storage unit 20 stores the account information provided by the account pool processing subunit 12 in the private storage space of the APP where the apparatus is located.

In addition, if the APP where the apparatus is located runs for the first time, the account pool processing subunit 12 may first acquire the account information from the Keychain corresponding to the intercommunication permissions of the APP where the apparatus is located and store same in the private storage space of the APP where the apparatus is located.

No matter which method of FIG. 8 or 9 is adopted, the apparatus may further comprise: a login processing unit 30, which is responsible for the login processing of the APP where the apparatus is located; in addition to the active login mode, if the private storage space of the current APP stores the account information, then according to the configured login policy of the current APP, one of the following methods may be adopted to log in:

When the login policy is silent intercommunication login, the account information stored in the private storage space is directly used to log in. The so-called silent intercommunication login refers to a "logging into one, logging into all" login mode, that is, as long as one of the APPs having intercommunication permissions logs in successfully, other APPs may also utilize the account information used by the logged-in APP to directly log in, and in this case, the account information comprises an account and a password.

When the login policy is selective intercommunication login, pieces of account information stored in the private storage space are displayed to a user for the user to select one of them to log in. The so-called selective intercommunication login means that the successful login of one of the APPs having intercommunication permissions does not affect the login of other APPs, and the account information thereof will be provided to other APPs to store; and when the user opens other APPs to log in, the stored account information (an available account information list) will be provided to the user for the user to perform selective login. In this case, the account information is an account, and the login processing unit 30 needs to acquire a password entered by the user to log in.

As one example, after the above-mentioned method and apparatus provided in the present invention are adopted, if it is assumed that Baidu Map, Baidu Library and Baidu Assistant are installed in the smartphone with the Android system of the user, and if the user enters the account and password in Baidu Map, then:

if the login policy configured in advance in these APPs provided by Baidu is silent intercommunication login, the account and password after encryption are stored in the private storage space thereof and are contained in the system broadcast to send. Since it is configured in advance that Baidu Map, Baidu Library and Baidu Assistant have intercommunication permissions therebetween in the permissions thereof, after receiving the system broadcast, Baidu Library and Baidu Assistant determine that they have intercommunication permissions with Baidu Map which sent the system broadcast, and then store the account and password after encryption therein in the private storage space thereof. After being opened subsequently, Baidu Library or Baidu Assistant may be logged into directly using the account and password after the account and password in the private storage space are decrypted, and at this moment, the user may log in without entering any account and password, and obviously, the entering cost is saved.

If the login policy configured in advance in these APPs provided by Baidu is selective intercommunication login, Baidu Map stores the account after encryption in the private storage space thereof and includes same in the system broadcast to send. Since it is configured in advance that Baidu Map, Baidu Library and Baidu Assistant have intercommunication permissions theretween in the permissions thereof, after receiving the system broadcast, Baidu Library and Baidu Assistant determine that they have intercommunication permissions with Baidu Map which sent the system broadcast, and then store the account after encryption therein in the private storage space thereof. After Baidu Library or Baidu Assistant is opened subsequently, the account in the private storage space is displayed to the user in the login interface, and the user may directly select the account to log in after entering the password; this method also saves the entering cost of the user to some extent. Certainly, if Baidu Library or Baidu Assistant have been logged into using other accounts previously, there must be other accounts in the private storage space thereof; when Baidu Library or Baidu Assistant is opened, other accounts previously used will also be provided to the user together for the user to select, and the user may also select the accounts used by Baidu Library or Baidu Assistant previously to log in.

As another example, after the above-mentioned method and apparatus provided in the present invention are adopted, if it is assumed that Baidu Map, Baidu Library and Baidu Assistant are installed in a smartphone with an IOS system of the user, and if the user enters an account and a password in Baidu Map, then:

if the login policy configured in advance in these APPs provided by Baidu is silent intercommunication login, the account and password after encryption are stored in the private storage space thereof and are stored in the corresponding Keychain. Since it is configured in advance that Baidu Map, Baidu Library and Baidu Assistant have intercommunication permissions therebetween in the permissions thereof, these APPs correspond to the same Keychain, and after being opened, Baidu Library and Baidu Assistant will be triggered to perform synchronization with the Keychain once, that is, acquire the account and password after encryption from the corresponding Keychain and store same in the private storage space thereof. After being opened subsequently, Baidu Library or Baidu Assistant may be logged into directly using the account and password after the account and password in the private storage space are decrypted, and at this moment, the user may log in without entering any account and password, and obviously, the entering cost is saved.

If the login policy configured in advance in these APPs provided by Baidu is selective intercommunication login, Baidu Map stores the account after encryption in the private storage space thereof and stores same in the corresponding Keychain. Since it is configured in advance that Baidu Map, Baidu Library and Baidu Assistant have intercommunication permissions therebetween in the permissions thereof, these APPs correspond to the same Keychain, and after being opened, Baidu Library and Baidu Assistant will be triggered to perform synchronization with the Keychain once, that is, acquire the account after encryption from the corresponding Keychain and store same in the private storage space thereof. After Baidu Library or Baidu Assistant is opened subsequently, the account in the private storage space is decrypted and the account is displayed to the user in the login interface, and the user may directly select the account to log in after entering the password; this method also saves the entering costs of the user to some extent. Certainly, if Baidu Library or Baidu Assistant have been logged into using other accounts previously, there must be other accounts in the private storage space thereof when Baidu Library or Baidu Assistant is opened, other accounts previously used will also be provided to the user together for the user to select, and the user may also select the accounts used by Baidu Library or Baidu Assistant previously to log in.

It needs to be noted that in the above-mentioned embodiments provided in the present invention, the Android system and the IOS system are taken as examples for description, but the method and apparatus provided in the present invention are not limited to the above-mentioned two systems, and are also applicable to other systems adopted by intelligent terminals. The intelligent terminals to which the present invention is applicable comprise but are not limited to: smartphones, PDAs and tablet computers, and may also be intelligent televisions, conference terminals, etc. capable of running various APPs.

It can be seen from the above description that the method and apparatus provided in the present invention has the advantages as follows:

1) by means of the method of the present invention, account information entered in any APP may be shared among APPs having intercommunication permissions with the APP, so that other APPs may be logged into using the intercommunicated account after being opened, without managing the account information about various APPs through a unified entrance, and thus the APP need not access the entrance in advance, and it is not required that the login may be realized only when the entrance is opened after exiting the APP; obviously, the flexibility and independence of APP login is improved, and the complexity of operation is reduced.

2) In the present invention, since there is no limitation of a unified entrance, various APPs may all adopt their own login interfaces, and the customization of skins and functions by APPs is not affected.

3) The present invention may either customize a silent intercommunication login mode, or may customize a selective intercommunication login mode, the implementation thereof is flexible, the user need not input the account information repeatedly, and the entering cost of the user is saved.

In certain embodiments provided in the present invention, it should be understood that the disclosed apparatus and method may be implemented in other forms. For example, the apparatus embodiment described above is merely illustrative, for example, the division of the units is merely a logical function division, and there may be other division methods in actual implementation.

In addition, various functional units in various embodiments of the present invention may be integrated into one processing unit, or each of the units may also exist alone physically, or two or more units may be integrated into one unit.

The integrated unit above implemented in the form of software functional units may be stored in a computer readable storage medium. The software functional units are stored in a storage medium and include several instructions for making a computer device (which may be a personal computer, a server, or a network device and so on) or a processor execute some steps of the method described in the embodiments of the present invention. The foregoing storage medium comprises: various media that may store program codes, such as a USB flash drive, a removable hard disk, a read-only memory (ROM), a random access memory (RAM), a magnetic disk, or an optical disk.

Detailed above are merely preferred embodiments of the present invention, and are not intended to limit the present invention. Any modifications, equivalent replacements, improvements and so on made within the spirit and principle of the present invention should be contained in the scope of protection of the present invention.

What is claimed is:

1. A method for providing communication among applications (APPs), comprising:
   acquiring user account information for a first APP;
   providing the user account information and permissions information to a second APP from the first APP via a system broadcast;
   confirming whether the second APP has intercommunication permissions with the first APP based upon the permissions information in the system broadcast
   enabling the second APP to acquire and store the user account information from the system broadcast upon confirming that the second APP has intercommunication permissions with the first APP; and
   applying the user account information to access the second APP after the first APP is accessed via the user account information.

2. The method of claim 1, further comprising:
   determining whether the first APP is being run for a first time;
   enabling the first APP to query account information about the second APP based upon said determining; and
   enabling the first APP to encrypt the account information obtained via said query and to store the encrypted account information.

3. The method of claim 1, further comprising at least one of confirming that a configured login policy of the first APP is silent intercommunication login and using the stored user account information to log into the first APP based upon said confirming that the configured login policy is the silent intercommunication login; and
   confirming that the configured login policy of the first APP is selective intercommunication login and enabling selection of presented predetermined portions of the stored user account information to log into the first APP based upon said confirming that the configured login policy is the selective intercommunication login.

4. The method of claim 3,
   wherein said using the stored user account information to log into the first APP includes using stored account and password information to log into the first APP; and
   wherein said enabling the selection of the presented predetermined portions of the stored user account information to log into the first APP includes using stored account information and a user-entered password to log into the first APP.

5. The method of claim 1, further comprising
   encrypting the user account information; and
   storing the encrypted user account information in a private storage space of the first APP.

6. An apparatus for providing communication among applications (APPs), comprising:
   a processor; and
   a memory having one or more programs stored thereon for instructing said processor, the one or more programs including:
   a first instruction for acquiring user account information for a first APP; and
   a second instruction for applying the user account information to access a second APP after the first APP is accessed via the user account information,
   wherein the one or more programs instruct said processor to provide the user account information and permissions information to the second APP via a system broadcast,
   wherein the second APP determines that the second APP has intercommunication permissions with the first APP based upon the permissions information in the system broadcast, acquires the user account information and stores the user account information in a private storage space of the second APP.

7. The apparatus of claim 6, wherein the one or more programs instruct said processor to query selected account information from the second APP via the system broadcast based upon a determination that the first APP is being run for a first time, to encrypt the selected account information and to store the encrypted selected account information.

8. The apparatus of claim 6, wherein the one or more programs include a third instruction for logging into the first APP according to a configured login policy and based upon a determination that the private storage space of said first APP stores the account information:
   using the account information stored in the private storage space to log into the first APP based upon a determination that the login policy is silent intercommunication login; and
   displaying selected portions of the user account information stored in the private storage space for selection to log into the first APP based upon a determination that the login policy is selective intercommunication login.

9. The apparatus of claim 8,
wherein the user account information is an account and a password based upon the determination that the login policy is silent intercommunication login; and
wherein the user account information is an account and the one or more programs instruct said processor to use a user-entered password to log in based upon the determination that the login policy is selective intercommunication login.

10. The apparatus of claim 6, wherein the one or more programs include a fourth instruction for storing the user account information in a private storage space of the first APP after the first APP successfully applies the user account information to log into the second APP.

* * * * *